United States Patent [19]

Tanimura

[11] 4,059,824

[45] Nov. 22, 1977

[54] AUTOMOTIVE LIGHT FOR PREVENTING REAR END COLLISION

[76] Inventor: Kiyotaka Tanimura, 5-2, Hama-cho 1-chome,, Odawara, Kanagawa, Japan

[21] Appl. No.: 717,558

[22] Filed: Aug. 25, 1976

[30] Foreign Application Priority Data

June 12, 1976 Japan .................. 51-68859

[51] Int. Cl.² .............................................. B60Q 1/26
[52] U.S. Cl. ........................................ 340/71; 340/94
[58] Field of Search ............................ 340/71, 66, 94

[56] References Cited

U.S. PATENT DOCUMENTS

| | | | |
|---|---|---|---|
| 2,572,144 | 10/1951 | Healy | 340/71 |
| 2,833,880 | 5/1958 | Repkow | 340/71 |
| 3,448,434 | 6/1969 | Nolte, Jr. et al. | 340/71 |
| 3,461,425 | 8/1969 | Schultz et al. | 340/71 |
| 3,821,701 | 6/1974 | Ross | 340/71 |

Primary Examiner—Donald J. Yusko
Attorney, Agent, or Firm—Wenderoth, Lind & Ponack

[57] ABSTRACT

An automotive light system for warning or notifying the drivers of the trailing cars includes green lamps the number of which being lit indicates the relative position of depression of the accelerator pedal, amber lamps for indicating an engine braking operation, and an intake pressure sensor for detecting the intake pressure of an engine of the automobile to extinguish the green lamps and to light the amber lamps when the intake pressure decreases below a predetermined level upon an engine braking operation.

3 Claims, 4 Drawing Figures

AUTOMOTIVE LIGHT FOR PREVENTING REAR END COLLISION

BACKGROUND OF THE INVENTION

This invention relates to automotive warning lights. Traffic laws and regulations dictate that various lights be provided in an automobile for warning or notifying drivers in other cars or pedestrians of the condition of the automobile which is running. For prevention of the rear-end collisions it is preferable that the driver of a trailing car be properly notified of the condition of a preceding car so as to apply a suitable braking operation. At the present time there is known only a stop light for warning the driver of a trailing car of a braking action. Thus, there is not any means for warning or notifying the driver of the trailing cars of various stages of engine braking operations of the preceding car.

SUMMARY OF THE INVENTION

It is accordingly an object of the present invention to provide automotive lights or lamps for warning the drivers of trailing cars of an engine braking operation of a preceding vehicle.

It is another object of the present invention to provide automotive lights or lamps for indicating to the drivers of trailing cars the occurrence of accelerating operations of a preceding vehicle by a plurality of green lights or lamps and of engine braking operations of the preceding vehicle by a plurality of amber lights or lamps.

BRIEF DESCRIPTION OF THE DRAWINGS

There are other objects and features of the present invention which will be apparent from a reading of the following part of the specification in conjunction with the accompanying drawings which indicate a preferred embodiment of the present invention, and in which.

DETAILED DESCRIPTION OF THE INVENTION

Figure 1:
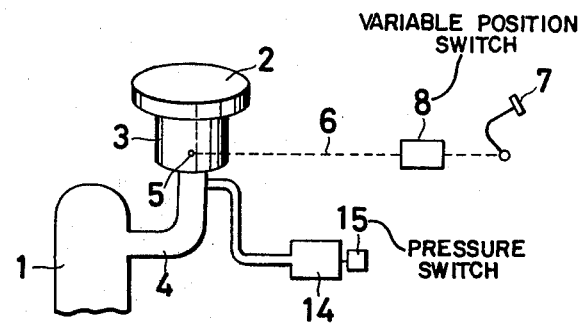
FIG. 1 is a schematic view showing manifold pressure detecting means and accelerator pedal movement detecting means according to the present invention.

Referring to FIG. 1, intake air is introduced through an air cleaner 2, a carburetor 3, and an intake pipe 4 into a cylinder 1 of an engine of an automobile. A shaft 5 of a throttle valve of the carburetor is coupled through a transmission 6 such as a cable or a rod to an accelerator pedal 7 for the purpose of controlling the engine by adjusting the opening of the throttle valve in the carburetor 3. According to the present invention, a sensor 8 is provided to detect the position of the accelerator pedal being depressed or the opening of the throttle valve. The sensor 8 is shown to detect the movement of the transmission 6 in the drawing, but it may be positioned to detect the angular movement of the accelerator pedal shaft or the shaft 5 of the throttle valve.

An intake pressure or manifold pressure sensor 14 is coupled to the carburetor 3 at a position downstream of the throttle valve thereof or to an intake manifold in a suitable position to actuate a switch 15 at a predetermined pressure level, for instance, at a pressure level of 0.2 kg/cm² absolute. The sensor 14 may be of any suitable type, such as, a spring loaded diaphragm or piston type or the like. Further, the sensor 14 may be of a known type utilizing a pressure gauge mechanism.

Figure 2:
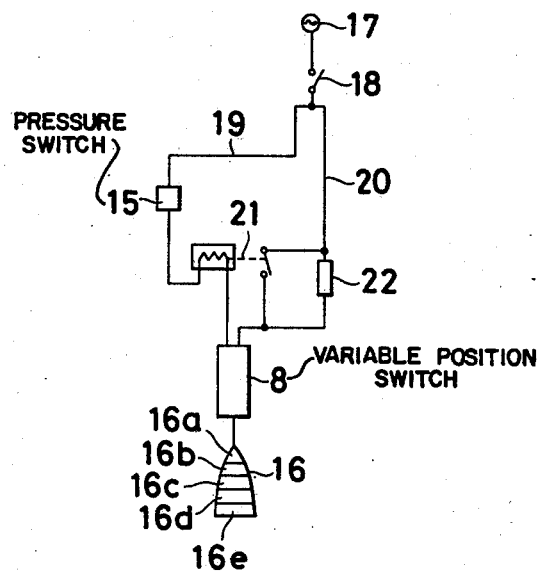
FIG. 2 is a schematic diagram of an electric circuit according to the invention.
Figure 4:
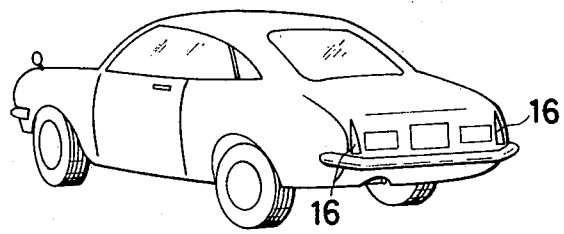
FIG. 4 is a perspective rear view of an automobile.

In FIG. 2 showing an outline of an electric system, a lamp assembly 16 is mounted at the rear end portion of the automobile. In the drawing, only one lamp assembly is shown, although it is preferable that a pair of lamp assemblies be provided on the right and left sides of the rear end of the automobile as shown in FIG. 4. The lamp assembly 16 consists of five portions 16a to 16e which are adapted to selectively indicate green and amber lights. To this end, green lights and amber lights may be provided in respective portions, or alternately, there may be used a combination of yellow or bright yellow glass and blue and red lamps. An electric power source 17 such as a battery and a generator of the electric system of the vehicle supplies electric power to the lamp assembly 16.

A green light circuit 19 acts to light the green lights under the control of the sensor 8, when switches 18 and 15 are turned on. An amber light circuit 20 acts to light the amber light under the control of sensor 8 when the switch 18 is on. However, when the green circuit 19 is energized, an electromagnetic switch 21 is turned off, so that the amber light is dimmed by a resistor 22. When the green light circuit is not energized, the switch 21 is turned on so that the intensity of the orange light is increased.

Figure 3:
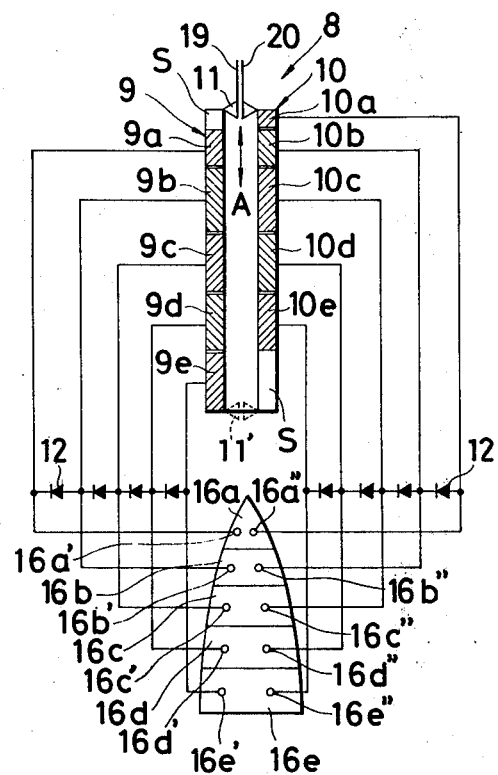
FIG. 3 is a detailed view of a portion of the electric circuit of FIG. 2.

As shown in FIG. 3, the sensor 8 consists of contact portions 9a – 9e and 10a – 10e and contacts 11 which cooperate with the contact portions. The contact portion 9 and 10 (the numerals generally represent respective contact portions 9a – 9e and 10a – 10e) as well as the contacts 11 may be relatively moved in the direction of arrow A in response to the position of the accelerator pedal being depressed or the opening of the throttle valve. In FIG. 3, the contacts 11 assumes the position of the solid lines at zero opening of the throttle valve or in the normal inactuated position of the accelerator pedal, and assumes the broken line position at the full open position of the throttle valve or the fully depressed position of the accelerator pedal. The contact portions 9a – 9e are connected respectively to green lights 16a' – 16e', and the contact portions 10a – 10e to amber lights 16a" – 16e" respectively. Rectifiers 12 are disposed in these connections as shown, so that when the contacts 11 cooperate with the contact portions 9a and 10b the green light 16a' and amber lights 16b" to 16e" are lit, and when the contacts 11 cooperate with the contact portions 9b and 10c the green lights 16a' and 16b' as well as amber lights 16c", 16d" and 16e" are lit. In FIG. 3, only the contact portion 10a contacts the contacts 11 at the zero opening position of the throttle valve, and a portion of contact position 9 opposite to the contact portion 10a is provided with a spacer S.

With the aforesaid arrangement, when the switch 15 is in its on position, i.e., when the intake pressure is over a predetermined value, the relative position of depression of the accelerator pedal is numerically indicated by the number of green lights 16a' to 16e' which are lit so that the drivers of trailing cars may have an indication of the speed of the vehicle. In this respect, amber lights in another partition in which the green lights are not lit are lit with reduced intensity, thereby fascilitating the recognition of the number of green lights being lit.

In an engine braking condition, the intake pressure is lowered below the predetermined level and the switch 15 is turned off, the green light circuit is disconnected and the green lights are extinguished. In this respect, for instance, when the accelerator pedal 7 is released from the fully depressed position, five orange lights will be lit at increased intensity, which notifies the drivers of the trailing cars that a severe engine braking operation has been applied on the preceding car and enables the trailing drivers to take suitable braking action sooner than previously possible. When the accelerating operation is applied immediately following the engine braking operation, the amber lights will be dimmed and a number of green lights corresponding to the amount of depression of the accelerator pedal will be lit. Thus, end collision accidents may completely be prevented according to the present invention, and safe and comfortable driving may be insured.

What is claimed is:

1. A vehicular light assembly for indicating the speed of movement of a vehicle and for indicating engine braking of the vehicle, said assembly comprising:
   a lamp including at least three first color lights and at least three second color lights;
   first switch means responsive to the relative position of the accelerator pedal of the vehicle, said first switch means comprising first and second contacts, a plurality equal to the number of first color lights of first contact portions one each electrically connected to a respective one of said first color lights, and a plurality equal to the number of second color lights of second contact portions one each electrically connected to a respective one of said second color lights, said first and second contacts being movable between and relative to said first and second contact portions as a function of the position of the accelerator pedal of the vehicle, with said first contact electrically contacting a respective one of said first contact portions and said second contact electrically contacting a respective one of said second contact portions;
   first circuit means for electrically connecting said first contact to an electrical power source of the vehicle and for thereby lighting selected of said first color lights as a function of the position of said first contact with respect to said first contact portions, thereby giving a visual indication of the speed of the vehicle;
   second switch means, electrically coupled to said first circuit means and responsive to the intake pressure of the engine of the vehicle, for electrically opening said first circuit means upon the decrease of said intake pressure below a predetermined level indicative of engine braking and for thereby extinguishing all of said first color lights;
   second circuit means for electrically connecting said second contact to the electrical power source of the vehicle and for thereby lighting selected of said second color lights as a function of the position of said second contact with respect to said second contact portions;
   a relay electrically coupled to said first circuit means and responsive to opening or closing thereof by said second switch means;
   said second circuit means including relay switch means responsive to and operable by said relay for opening said second circuit means when said first circuit means is closed and for closing said second circuit means when said first circuit means is open; and
   dimming resistor means, electrically coupled to said second circuit means in parallel with said relay switch means, for electrically coupling said second contact with the vehicle electrical power source when said second circuit means is opened and for lighting said selected second color lights at a dimmed intensity.

2. An assembly as claimed in claim 1, wherein said lamp includes five first color lights and five second color lights.

3. An assembly as claimed in claim 1, wherein said first color lights are green and said second color lights are amber.

* * * * *